United States Patent [19]
Helbling

[11] Patent Number: 5,546,303
[45] Date of Patent: Aug. 13, 1996

[54] METHOD OF AND SYSTEM FOR CORRELATING CHARITABLE CONTRIBUTIONS

[76] Inventor: Edward Helbling, 47 Annandale Rd., Commack, N.Y. 11725

[21] Appl. No.: 215,372

[22] Filed: Mar. 21, 1994

Related U.S. Application Data

[63] Continuation-in-part of Ser. No. 12,743, Feb. 3, 1993.

[51] Int. Cl.⁶ .............................. G06F 17/60; G06F 7/04; B42D 15/00; G06G 7/52
[52] U.S. Cl. ......................... 364/401; 395/375; 221/157; 235/375; 235/381; 340/541; 340/825.35; 194/205; 194/209; 194/350; 283/70
[58] Field of Search ..................... 364/401, 405, 364/406; 235/379, 380, 375, 92, 381; 340/541, 825.35; 194/350, 209, 205; 395/375

[56] References Cited

U.S. PATENT DOCUMENTS

| | | | |
|---|---|---|---|
| 3,852,576 | 12/1974 | Rudd | 235/92 GA |
| 4,157,829 | 6/1979 | Goldman et al. | 273/138 |
| 4,319,336 | 3/1982 | Anderson et al. | 395/375 |
| 4,809,837 | 3/1989 | Hayashi | 194/205 |
| 4,973,952 | 11/1990 | Malec et al. | 340/825.350 |
| 5,013,896 | 5/1991 | Ono et al. | 235/381 |
| 5,091,713 | 2/1992 | Horn et al. | 340/541 |
| 5,150,817 | 9/1992 | Livingston | 221/81 |
| 5,190,133 | 3/1993 | Bolen | 194/350 |
| 5,192,854 | 3/1993 | Counts | 235/375 |
| 5,226,519 | 7/1993 | DeWoolfson | 194/209 |
| 5,243,174 | 9/1993 | Veeneman et al. | 235/381 |
| 5,283,829 | 2/1994 | Anderson | 380/24 |
| 5,308,120 | 5/1995 | Thompson | 283/70 |
| 5,339,985 | 8/1994 | Perez | 221/151 |
| 5,353,218 | 10/1994 | De Lapa et al. | 364/401 |

OTHER PUBLICATIONS

"Charitable ATM Menu Option", ABA Banking Journal vol. 85 issue n 4, p. 58(1) Apr. 1993.
"Charity Through the Bank" EFT Report v 17 issue n 23 p. 5(2) Nov. 9, 1994.
"Donating to Charity New Automated" Oakland Press Pontiac Mich. Jan. 21, 1994.

*Primary Examiner*—Gail O. Hayes
*Assistant Examiner*—Felicia Ives
*Attorney, Agent, or Firm*—Herbert Dubno

[57] ABSTRACT

A central office correlates charitable contributions made at vending stations in food service establishments which issue information carriers in return for charitable contributions which are receipts for the contribution and entitle the donor to a beverage dispensed from a machine responding to the information carrier.

5 Claims, 1 Drawing Sheet

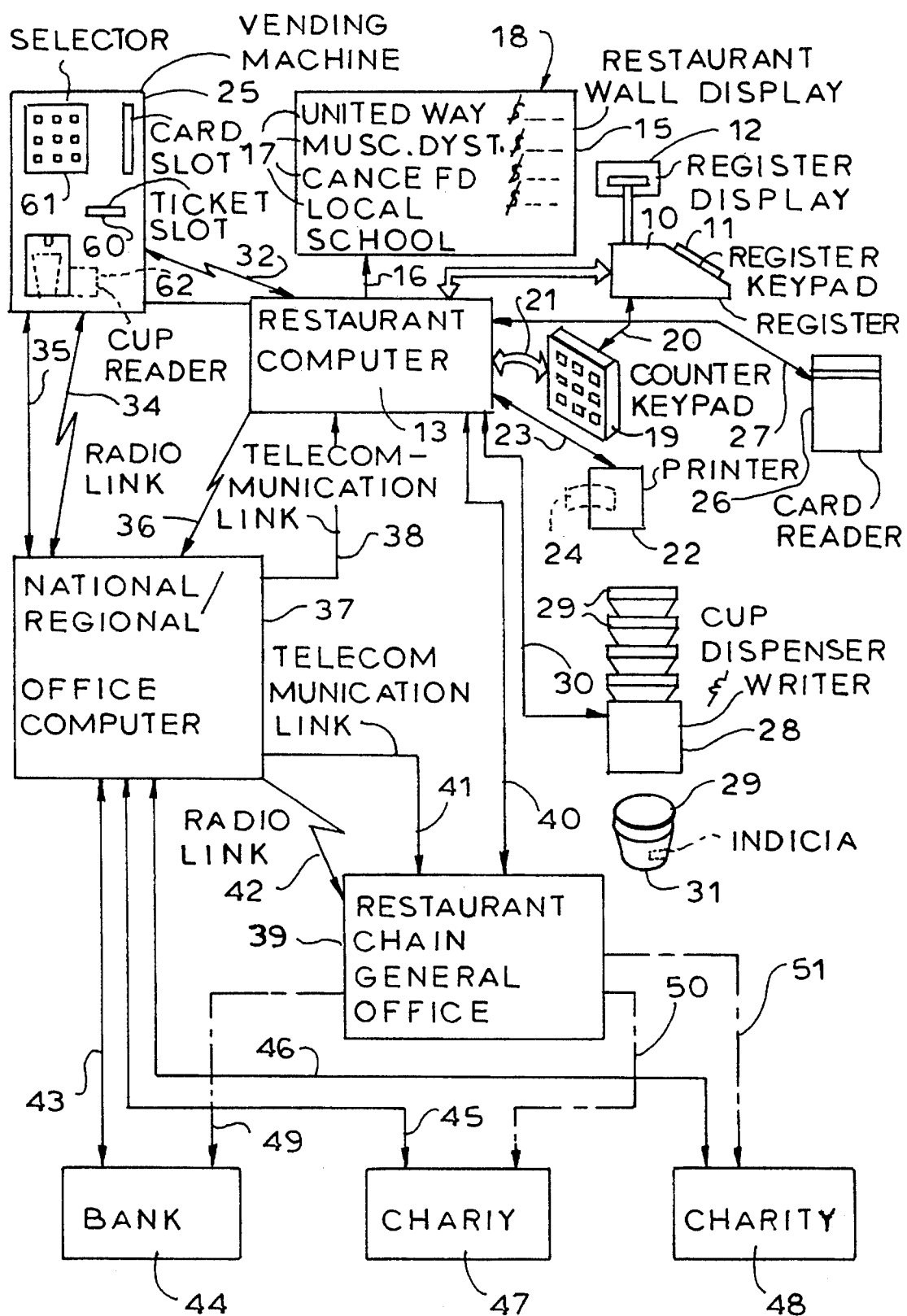

005,546,303

METHOD OF AND SYSTEM FOR CORRELATING CHARITABLE CONTRIBUTIONS

CROSS REFERENCE TO RELATED APPLICATION

This application is a continuation-in-part of my application Ser. No. 08/012,743 filed 3 Feb. 1993.

FIELD OF THE INVENTION

The present invention relates to a system for correlating charitable contributions and to a method of operating that system or to a method of effecting such correlation, especially in conjunction with the vending of food products including beverages.

BACKGROUND OF THE INVENTION

In my above-mentioned earlier application, I have described a vending machine system and, specifically, a method of and apparatus for the vending of beverages which affords greater versatility as to how those beverages may be dispensed. That system was especially directed to the vending of soft drinks and like carbonated and noncarbonated beverages at fastfood facilities or at vending machines wherever the dispensing of the beverage was to be effected by other than cash control.

According to the earlier application, the vending or dispensing machine was responsive, not to cash or only to cash, but to indicia on a card, slip or other medium carried by the patron and inserted into the dispensing machine to respond thereto.

The patron could be provided with a card with indicia which could be mechanically, optically, magnetically or electronically sensed to release a beverage, an item of foodstuff or the like, the card being given to the patron, for example, at an ordering location in the food service establishment or as a premium elsewhere. That card could be a single-use card or a multiuse card which, if desired, could be punched or otherwise marked so that, for example, after a certain number of markings, the patron could be entitled to a free beverage or food item.

In one aspect of that system, the medium carried by the patron to the machine and read by the machine was the cup into which the product was dispensed and which carried the indicia authorizing the machine to dispense the beverage.

In another aspect of that earlier system, the card registered a value which was prerecorded in the card or could be incremented at another machine or payment station, such as a cashier, the value of the card being decremented at the machine with each dispensing.

That system moreover provided for central station monitoring of the status of the vending machine and enabled maintenance thereof and, of course, central charging based upon utilization.

OBJECTS OF THE INVENTION

It is the principal object of the present invention to advance the principles of the earlier application and, in particular, increase the versatility of the facilities provided thereby.

Another object of this invention is to provide an improved method of and system for the correlation of charitable contributions, for example, in conjunction with vending and dispensing machines and food-service establishments.

SUMMARY OF THE INVENTION

Basically the invention allows collection of a charitable contribution from a patron at the cash register of a fastfood operation conditioned in part upon the establishment awarding the patron a free beverage, for example, which can be drawn by the patron from a dispenser based upon a slip or other information carrier issued or marked at the cash register and to which the dispensing machine can respond.

At the cash register, a keyboard, push-button array or other registration means is provided to enable the patron to record the particular charity to which that patron desires his or her contribution to be assigned.

In the spirit of positive competition between foodservice establishments in a given locality or even at different localities, a display is provided in the facility to register the totals contributed to a given charity.

The information regarding the amounts contributed (from the cash register) and the charity selected (from the panel) is telecommunicated to a central location at which the fastfood establishment or chain is debited for the contributions made periodically, so that, for example, a check can be forwarded to that central location or a bank credit for the central location made available through conventional wire-transfer technology.

At the central location, based upon the data received, the amounts due to the several charities are calculated and the accounts of those charities may be credited or checks drawn to them together with any appropriate statements as to the sources of the contributions so that appropriate acknowledgment may be made.

An important aspect of the invention is based upon the fact that the central location can be used as a facility for soliciting gifts from national proud sponsors or the like which can be awarded as prizes to the donors in a lottery like system based upon, for example, a number of contributors per day at a particular establishment, a number of contributors overall for a particular food chain, the time of day or some other factor. Thus, for example, an automobile company may contribute an automobile, a travel company or airline a trip to some interesting location, an amusement company might contribute a visit to an amusement park, a retail food chain might contribute a certain amount of groceries, or products and services may be contributed by local sponsors and, based upon a signal transmitted from the central location, the prize can be awarded to an individual donor who, at the instant of signal transmission or meeting a criterion represented by that transmission, fortuitously makes a contribution and thus becomes eligible for the prize. If desired, the award can be printed on the information carrier received by that patron so that the award can be claimed at whatever location the central station designates.

This facility to solicit and distribute prizes centrally, prevents collusion in awarding prizes, maximizes the interest in patrons in making contributions and promotes repeated contributions.

The patron, in consideration of the charitable contribution made, is in turn awarded a token, slip or other information carrier (see the aforementioned copending application) which can constitute a receipt for the charitable contribution and can be utilized in the beverage vending machine to trigger dispensing of the beverage.

Where the patron elects not to select a particular charity on the panel, a default charity may be automatically selected by the computer system, for example, a charity with which the particular food-service establishment has established specific ties, to automatically record that charity for the particular contribution.

BRIEF DESCRIPTION OF THE DRAWING

The above and other objects, features, and advantages will become more readily apparent from the following description, reference being made to the accompanying drawing, the sole FIGURE of which is a diagram of the system of the present invention.

SPECIFIC DESCRIPTION

In the drawing I have shown a cash register 10 with a register keypad 11 and a register display 12, located at a vending station of a fastfood establishment and representing one of a number of such registers at the establishment which, in turn, can represent any of a number of establishments linked to a central office of a restaurant chain and which, in turn, may be one of a multiplicity of restaurant chains availing itself of the contribution correlation service which the central office can provide.

In that case, then, each of the restaurants may be provided with a respective computer 13 linked to all of the registers 10 by a network of some kind, the information bus or the like represented at 14.

All of the vending stations of a particular restaurant, therefore, can provide inputs to the computer 13 which can output data to a restaurant wall display 15 to which it is coupled by the line 16. On the display, which may be located at a prominent location in the restaurant so that it can be viewed by all patrons, a number of names of charities 17 may be displayed along with dollar amounts 18 collected at the particular restaurant for these charges. The display may be enhanced with other information, for example, a goal for a particular charity sought to be met by current collections, other information as to services performed by the respective charity, and/or national goals for the restaurant chain, local goals for the community, etc.

At the vending station of the particular register 10 a keypad or other selection panel 19 can be provided and can be coupled to the computer indirectly through the register as represented at 20 or directly via the information bus or network 21 for selection of the particular charity or donee the patron desires to choose.

At the local station, moreover, there can be provided a printer 22 connected to the computer 13 by the data line 23 for issuing a slip 24 which, as previously mentioned, can be a receipt for the contribution and has the additional function that it contains information enabling it to operate a vending machine 25 to dispense one or more beverages, depending upon the information imprinted on that slip. A card reader 26 connected by the data line 27 to the computer may allow credit card purchases and contributions and the local station can include, if desired, a cup dispenser 28 for beverage cups 29.

The dispenser 28 is connected to the restaurant computer 13 by the data line 30 and, in the manner described in my aforementioned application, can include means for applying indicia 31 to a cup 29 representing the number of beverage fillings permitted based, for example, on the level of charitable contributions represented at the register 10.

The computer 13 can be connected to the vending machine 25 by a wireless communication path represented at 32 or by a telecommunication system or information bus 33 and to a national or regional office computer by the wireless or telecommunication routes 34 and 35, respectively. This central monitoring of the dispensing machine is described more fully in my above-mentioned copending application.

The restaurant computer, in turn, can be coupled by a radio link 36 to the central office computer 37 or can be connected by some other telecommunication link 38 therewith.

In addition, the restaurant chain may have a computer 39 coupled to the restaurant computer 13 by the link 40 and can, in addition, have a telecommunication link 41 or a radio link 42 with the central office computer 37.

Essential to the invention are communication links 43 to one or more banks 44 providing financial services to the charities or to the restaurant chain or central office 37, and telecommunication links 45 and 46 to the respective charities represented at 47 and 48. If desired, the restaurant chain may have communication links 49 with the bank 44 and 50, 51 with the charities if direct payments to the charities are desirable or direct transfer through the bank is of interest, bypassing the national office 37.

In operation of the system, a prospective donor, generally also a patron of the fastfood establishment, selects the food items offered by the cashier at the register 10 who punches in the food items, registering the charges. The patron is offered the opportunity to make a certain minimum donation to a particular charity, e.g. twenty-five cents, and if the donor is willing, the amount of the contribution, including any additional amount the donor may choose, is punched into the cash register by the cashier and appears on the display 12. The registration of this contribution and collection of the equivalent amount from the patron at the cash register is transmitted to the restaurant computer 13 and increments the memory thereof with respect to the particular contribution. The patron manually operates the panel 19 to signal the charity to be selected to benefit from that contribution and via the restaurant computer 13 the display 18 for the charity 17 is incremented on the wall display 15. If cash is not tendered, the total amount of the patron's bill may be charged to a charge card at the card reader 26.

In any event, a slip 24 is printed with a receipt for the contribution and information as to the magnitude thereof as well as information as to the number of beverages to be dispensed as the reward by the service establishment for the contribution level made. Alternatively a cup can be issued with corresponding indicia at the cup dispenser 28.

The patron can then insert his slip 24 into the ticket slot 60 of the vending machine 25 and, using the selector panel 61 can choose the beverage desired, which can be dispensed into a cup supplied by the machine. Alternatively, the patron can insert the cup 29 which is scanned by the cup reader 62 to register the number of refills allowed. The beverage is then dispensed.

Assume that the central station has solicited prizes from national proud sponsors who desire to participate in a charitable program with a particular charity or with the particular food chain or with any charity to promote the increased giving by the public.

The central station 37 can send to a particular restaurant computer (in the case of a prize to be awarded from a local source) or to all restaurant computers of the particular chain in the case of a prize to be awarded only to patrons of a single restaurant chain or to all of the restaurant computers (in the case of prizes to be awarded to patrons who contribute to a particular national charity or group of charities. The information represented by that signal indicating a condition Which may be met by a particular patron at a particular food service establishment. When that condition is met by the patron, the restaurant computer informs the patron via the printer 22 and the winning of the prize may also be displayed upon the wall display. The restaurant computer notifies the central station 37 of the fact that the particular prize has been won.

Thus any patron availing him or himself of the opportunity to make a contribution, not only can benefit from the free food service item provided at the food service machine but also has the opportunity to win a major prize.

Either immediately or after the data has been collected in the restaurant computer, the data as to charitable contribution amounts and the respective donees is transmitted by restaurant computer 13 via the link 36 or 38 to the central computer 37 at which the accounts of the various charities are credited with the contributions made.

The central computer 37 receives such data from all of the restaurants directly or indirectly from the central computers 39 of the restaurant chains, and accumulates totals due to each of the charities. That information is transmitted to the charities via the links 45 and 46 or to the bank 44 of the charity. The account of the central station can be debited and a transfer made directly to the account of the charity.

At appropriate intervals, say monthly, the central station computer 37 will report to the restaurant chain 39 or to the individual restaurant at 13, the amounts due for the charitable contributions and payment can be made by direct-wire transmissions to and from the bank or by check.

As a consequence, the charities involved, benefit at an earlier point from the availability of funds than they might otherwise, the restaurants can participate in charitable campaigns and benefit from the goodwill that that engenders, the bookkeeping problems of the restaurant for charitable contributions which might otherwise be severe, are eliminated, patrons benefit from the largess of the food-service establishment in making beverages available free of charge to contributors and thus are induced to contribute to a greater extent than they otherwise might, and charities benefit from promotions which may be generated by the food-service establishments and localities in the interest of reaching contribution target levels.

The data and signal links 14, 16, 21, 23, 27, 30, 32, 33, 34, 35, 36, 38, 40, 41, 42, 43, 45, 46, 49, 50, 51 can represent any wire or wireless transmission path including infrared (IR) transmission.

I claim:

1. A method of correlating charitable contributions, comprising the steps of:

(a) collecting a charitable contribution from a donor at a vending station;

(b) enabling a donor-responsive register and, upon actuation of said register by said donor, recording a selection of a donee to which said charitable contribution is to be assigned;

(c) transmitting data representing said selection and an amount of said charitable contribution to a central location remote from said vending station;

(d) collecting said data from said vending station and a multiplicity of other vending stations at said central location, recording said data at said location and processing the recorded data to total sums due to a multiplicity of donees selectable at said register;

(e) distributing to said multiplicity of donees respective sums determined by the processing of the recorded data, (f) issuing to each donor at the respective vending station an information carrier; and (g) providing in a vicinity of said vending station a dispensing station operable by said information carrier to dispense a product in response to said information carrier, said information carrier being a cup and said dispensing station being a beverage vending machine operable by said information carrier.

2. A method of correlating charitable contributions, comprising the steps of:

(a) collecting a charitable contribution from a donor at a vending station;

(b) enabling a donor-responsive register and, upon actuation of said register by said donor, recording a selection of a donee to which said charitable contribution is to be assigned;

(c) transmitting data representing said selection and an amount of said charitable contribution to a central location remote from said vending station;

(d) collecting said data from said vending station and a multiplicity of other vending stations at said central location, recording said data at said location and processing the recorded data to total sums due to a multiplicity of donees selectable at said register;

(e) distributing to said multiplicity of donees respective sums determined by the processing of the recorded data, (f) issuing to each donor at the respective vending station an information carrier; and (g) providing in a vicinity of said vending station a dispensing station operable by said information carrier to dispense a product in response to said information carrier, said information carrier being a slip and said dispensing station being a beverage vending machine having a slot adapted to receive said slip, said method comprising the step of inserting said slip in said slot to activate said machine to dispense a beverage.

3. The method defined in claim 2, further comprising the step of accumulating a tally at said vending station of sums assigned to each of said donees and displaying at said vending station respective symbols of said donees and the respective accumulated sums contributed to the donees at the respective vending station.

4. The method defined in claim 2, comprising the step of debiting said vending station from said central location for amounts donated, in response to the data transmitted to said central station.

5. The method defined in claim 4 wherein said vending station is formed by a cash register of a food-service establishment constituting part of a food service chain, said chain being debited from said central location for amounts donated, in response to the data transmitted to said central station.

* * * * *